(12) United States Patent
Mores et al.

(10) Patent No.: US 11,117,674 B2
(45) Date of Patent: Sep. 14, 2021

(54) AIRCRAFT WITH AN AIRFRAME AND AT LEAST ONE ELECTRICALLY POWERED THRUST PRODUCING UNIT

(71) Applicant: AIRBUS HELICOPTERS DEUTSCHLAND GMBH, Donauworth (DE)

(72) Inventors: Sebastian Mores, Munich (DE); Martin Blacha, Donauworth (DE); Christian Reichensperger, Asbach Baeumenheim (DE); Klaus Rittel, Neusaess (DE); Marco Schneeberger, Rosenheim (DE); Michael Geiss, Harburg (DE); Markus Paschek, Gessertshausen (DE); Marius Bebesel, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 559 days.

(21) Appl. No.: 15/832,031

(22) Filed: Dec. 5, 2017

(65) Prior Publication Data

US 2018/0170509 A1 Jun. 21, 2018

(30) Foreign Application Priority Data

Dec. 7, 2016 (EP) .................................... 16400060

(51) Int. Cl.
*B64C 27/04* (2006.01)
*B64C 1/06* (2006.01)
*B64D 27/24* (2006.01)

(52) U.S. Cl.
CPC ................ *B64D 27/24* (2013.01); *B64C 1/06* (2013.01); *B64C 27/04* (2013.01)

(58) Field of Classification Search
CPC ........ B64D 27/24; B64D 27/04; B64C 27/02; B64C 1/061; B64C 1/064; B64C 1/06
See application file for complete search history.

(56) References Cited

U.S. PATENT DOCUMENTS

| 5,519,543 A | 5/1996 | Olsson et al. |
| 5,810,284 A * | 9/1998 | Hibbs .................... B64C 39/10 244/13 |

(Continued)

FOREIGN PATENT DOCUMENTS

| CA | 2315524 A1 * | 5/2001 | ............. B64D 27/24 |
| CA | 2769796 A1 | 9/2012 | |

(Continued)

OTHER PUBLICATIONS

European Search Report for European Application No. EP 16400060, Completed by the European Patent Office, dated May 9, 2017, 8 pages.

*Primary Examiner* — Magdalena Topolski
(74) *Attorney, Agent, or Firm* — Brooks Kushman P.C.

(57) ABSTRACT

An aircraft with an airframe and at least one thrust producing unit the at least one thrust producing unit being electrically powered by an associated electrical engine that is electrically connected to an electrical energy source via an electrical energy distribution system, wherein the airframe comprises at least one load carrying section and at least one propulsion system carrying section, wherein the at least one load carrying section and the at least one propulsion system carrying section are segregated from each other, wherein the at least one load carrying section is provided for transportation of passengers and/or cargo, and wherein the at least one propulsion system carrying section is provided for carrying at least essentially the electrical energy source and the electrical energy distribution system.

20 Claims, 7 Drawing Sheets

(56) References Cited

U.S. PATENT DOCUMENTS

| | | | |
|---|---|---|---|
| 6,126,113 A | | 10/2000 | Navickas |
| 9,085,355 B2 * | | 7/2015 | DeLorean ............ B64C 29/0033 |
| 9,248,908 B1 * | | 2/2016 | Luyks ..................... B64C 27/12 |
| 2009/0140095 A1 | | 6/2009 | Sirohi et al. |
| 2011/0073717 A1 | | 3/2011 | Foucault et al. |
| 2011/0301784 A1 * | | 12/2011 | Oakley ................... B64C 27/04 |
| | | | 701/2 |
| 2012/0224058 A1 | | 9/2012 | Benning et al. |
| 2015/0136906 A1 * | | 5/2015 | Fink .......................... B64C 1/18 |
| | | | 244/119 |
| 2015/0256123 A1 | | 9/2015 | Ahn |
| 2016/0090196 A1 | | 3/2016 | Besettes et al. |

FOREIGN PATENT DOCUMENTS

| | | |
|---|---|---|
| CA | 2909314 A1 | 10/2014 |
| DE | 4131569 A1 | 3/1993 |
| DE | 102008059123 A1 | 5/2010 |
| WO | 2009153471 A2 | 12/2009 |
| WO | 2009153471 A3 | 3/2010 |

\* cited by examiner

AIRCRAFT WITH AN AIRFRAME AND AT LEAST ONE ELECTRICALLY POWERED THRUST PRODUCING UNIT

CROSS-REFERENCE TO RELATED APPLICATIONS

This application claims priority to European patent application No. EP 16400060.6 filed on Dec. 7, 2016, the disclosure of which is incorporated in its entirety by reference herein.

BACKGROUND OF THE INVENTION

(1) Field of the Invention

The invention is related to an aircraft with an airframe that comprises a load carrying framework and, more particularly, to an aircraft with at least one thrust producing unit that is electrically powered by an electrical engine, the electrical engine being electrically connected to an electrical energy source via an electrical energy distribution system.

(2) Description of Related Art

An airframe of an aircraft with one or more electrically powered thrust producing units that is intended for air transportation can generally be provided with at least one load carrying section that comprises at least a cockpit and that may further comprise a cabin for passengers and/or cargo. However, air transportation is a field that must typically take into account strict applicable authority regulations, certification requirements and safety demands independent of a selected air transportation vehicle, such as e.g. helicopters, airplanes, hybrid aircrafts, rockets and so on. Such authority regulations, certification requirements and safety demands are e.g. specified by the US-American Federal Aviation Regulations (FAR) from the US-American Federal Aviation Administration (FAA), the European Certification Specifications (CS) from the European Aviation Safety Agency (EASA) and/or other aviation authority ruling.

Accordingly, the passengers must be transported safe and securely in such a high-voltage environment that must further fulfil all comparatively high standards that are defined by the above-mentioned currently applicable authority regulations, certification requirements and safety demands. However, currently no aircraft with such a high-voltage environment is known that satisfies these high standards, so that currently no aircraft with such a high-voltage environment appears to be certifiable by the FAA, EASA and/or other aviation authority ruling.

One example of such an aircraft with a high-voltage environment is the autonomous aerial vehicle EHANG 184 that was developed by BEJING Yi-Hang Creation Science & Technology Co., Ltd. The EHANG 184 is provided with high-voltage energy sources and a high-voltage energy distribution system, both of which are arranged together in a lower airframe region of the aircraft, i.e. directly below a respective load carrying section for accommodation of the passengers. This design corresponds more or less to conventional helicopter design, wherein classic fuel tanks are located beneath a given load carrying section. However, this design generally represents a safety issue, since e.g. in case of a crash of the aircraft the high-voltage energy sources and/or the high-voltage energy distribution system may be forced to protrude upwards into the respective load carrying section and come into contact with the passengers and, thus, endanger the latter.

Another example of an aircraft with a high-voltage environment is the multicopter VOLOCOPTER VC200 that was developed by e-Volo GmbH. The VOLOCOPTER VC200 has high-voltage energy sources and a high-voltage energy distribution system that are both arranged in one common single compartment located behind a respective load carrying section that is provided for accommodation of the passengers. However, arranging all high-voltage energy sources and the high-voltage energy distribution system together in one common single compartment also represents a safety issue.

Still another example of an aircraft with a high-voltage environment is the vertically taking off and landing (VTOL) aircraft S2 that was developed by JOBY Aviation, Inc. The S2 is provided with high-voltage energy sources that are at least partly arranged in a lower airframe region of the aircraft, i.e. directly below a respective load carrying section for accommodation of the passengers. This design corresponds again more or less to conventional helicopter design, wherein classic fuel tanks are located beneath a given load carrying section. However, as already mentioned above this design generally represents a safety issue, since e.g. in case of a crash of the aircraft the high-voltage energy sources and/or the high-voltage energy distribution system may be forced to protrude upwards into the respective load carrying section and come into contact with the passengers and, thus, endanger the latter.

The document US2015256123 describes a solar propelled aircraft having photovoltaic cell modules mounted in two pairs of fixed wings and a body including a tail on which is mounted an aft propeller that is aside the cabin and freight compartment. The aircraft has cell modules mounted in the fixed wings and in the tail portion.

The document US2009140095 describes an all-electric rotary-wing aircraft. The rotary-wing aircraft includes a main rotor system supported by an airframe having an extending tail which mounts an anti-torque system. Mounted in the airframe, a flight control system generally includes an automatic flight control system communicating with an electronic speed controller, a collective controller, a cyclic controller, a yaw controller and a cockpit instrument display system. In the airframe and behind the controllers, are installed electric motors and an on-board power source such as a battery.

The document WO2009153471 describes an aircraft having an external structure including a fuselage, wings and tail planes elements. In the external structure are fitted converters for transforming light energy into electrical energy. If a controlling device detects any excess of electrical energy, this energy is used to power an electric motor or to deliver energy to internal combustion engines 40 attached to the fixed wings.

The documents U.S. Pat. No. 6,126,113 and DE4131569 were also considered.

In summary, important safety issues arise in currently known aircrafts with high-voltage environments due to a respective integration of the high-voltage environments in the aircrafts, i.e. the arrangement of components of the high-voltage environments with respect to load carrying sections provided in these aircrafts. These safety issues must be considered in design of new aircrafts with high-voltage environments in order to enable their certification by the FAA, EASA and/or other aviation authority ruling.

Furthermore, accessibility issues may arise at least with respect to the positioning of given high-voltage energy sources in respective lower airframe regions of currently known aircrafts with high-voltage environments. More specifically, if the given high-voltage energy sources are implemented by means of rechargeable high-voltage batteries, these batteries must frequently be recharged to allow for a continued operation of the aircrafts. However, as recharging of the rechargeable high-voltage batteries is usually very time-consuming, a technically feasible solution for preventing an undue retention time of the aircrafts on ground is required. By way of example, such a technically feasible solution may consist in exchanging the rechargeable high-voltage batteries prior to recharging with already charged high-voltage batteries. Thus, the rechargeable high-voltages batteries can be recharged separate from respective aircrafts without implying an undue retention time of the respective aircrafts on ground. Nevertheless, in this case an underlying airframe structure must be designed accordingly in order to provide for an adequate and suitable accessibility of the rechargeable high-voltage batteries on the respective aircrafts so that a required exchange time can be minimized.

BRIEF SUMMARY OF THE INVENTION

It is, therefore, an object of the present invention to provide a new aircraft that is designed for transportation of passengers and/or cargo and that comprises an improved airframe structure and that is, in particular, suitable and adapted for being certified by the FAA, EASA and/or other aviation authority ruling when being equipped with a high-voltage environment.

This object is solved by an aircraft having the features of claim 1. More specifically, according to the present invention an aircraft with an airframe and at least one thrust producing unit is provided. The at least one thrust producing unit is electrically powered by an associated electrical engine that is electrically connected to an electrical energy source via an electrical energy distribution system. The airframe comprises at least one load carrying section and at least one propulsion system carrying section. The at least one load carrying section and the at least one propulsion system carrying section are segregated from each other. The at least one load carrying section is provided for transportation of passengers and/or cargo, and the at least one propulsion system carrying section is provided for carrying at least essentially the electrical energy source and the electrical energy distribution system.

Advantageously, the segregation of the at least one load carrying section from the at least one propulsion system carrying section enables an efficient and reliable separation of a respectively selected propulsion system from passengers, cargo and/or other load, which increases safety at least in common cause failures of the respectively selected propulsion system. Thus, at least a safe and secure passenger transportation can be guaranteed independent on a respectively selected propulsion system.

More specifically, as the inventive aircraft is intended for being equipped with at least one or more electrical engines that are respectively electrically connected to an electrical energy source via an electrical energy distribution system, the at least one propulsion system carrying section can beneficially be used for accommodation of respective energy source units of the electrical energy source, as well as of the electrical energy distribution system. This is particularly advantageous, if the at least one or more electrical engines, the electrical energy source and the electrical energy distribution system define a high-voltage environment. Thus, based on a currently applicable ruling of the competent authorities, i.e. the FAA, the EASA, or any other competent authorities, the high-voltage environment can be arranged in order to prevent any harm to carried sensible objects, such as e.g. passengers, in case of hazardous events, such as e.g. a crash of the aircraft.

According to one aspect, the airframe of the inventive aircraft is provided with standardized electrical and mechanical interfaces and suitable mounting fixtures such as quick releases provided between respective energy sources and the airframe in a way that a quick interchangeable characteristic of any non-structural item is provided. Preferably, the airframe is based on a crashworthy concept for passengers and the respective energy sources. Advantageously, the airframe is damage tolerant and defines a robust structure, as only a small part of an underlying primary structure is directly exposed to the environment and is, thus, out of damage prone zones.

According to a preferred embodiment, the at least one propulsion system carrying section comprises at least a first zone and a second zone that are segregated from each other, the first zone being provided for carrying the energy distribution system and the second zone being provided for carrying the electrical energy source.

Advantageously, segregation of the at least one propulsion system carrying section into at least a first zone and a second zone enables a safe and secure arrangement of a respectively selected propulsion system within the inventive aircraft, which increases safety at least in failure cases of respective sub-systems of the respectively selected propulsion system. Thus, a safe and secure passenger transportation can especially be guaranteed if the inventive aircraft is intended for being equipped with an electrical, hybrid or mild-hybrid propulsion system, in particular with a high-voltage environment.

According to a further preferred embodiment, the airframe comprises at least one longeron that segregates the first zone from the second zone.

According to a further preferred embodiment, the at least one propulsion system carrying section comprises at least one third zone that is segregated from the first zone and spaced apart from the second zone, the at least one third zone being provided for carrying at least a portion of the electrical energy source.

According to a further preferred embodiment, the airframe comprises at least one longeron that segregates the first zone from the at least one third zone.

According to a further preferred embodiment, the airframe comprises a load carrying framework and at least one covering item, wherein the third zone is at least partly arranged between the load carrying framework and the at least one covering item.

Advantageously, provision of the airframe with the load carrying framework and one or more covering items allows implementation of an underlying primary structure, i.e. the load carrying framework, which is decoupled from a respective outer shell, i.e. the one or more covering items. This has a significant advantage for manufacturing, as the inventive aircraft can be built from the inside out, whereby a suitable accessibility to all parts is given. Furthermore, by preferably implementing the at least one covering item as a detachable and exchangeable covering item, the at least one propulsion system carrying section can be configured for guaranteeing an adequate and suitable accessibility.

Furthermore, by implementing the at least one covering item as a detachable and exchangeable covering item, the inventive aircraft advantageously provides for a high customer flexibility due as its airframe can easily be customized so that the inventive aircraft can be designed as a kind of "universal" transport vehicle, which can be adapted to respective needs comparatively quickly within a turn-around time of a few minutes. In other words, the customizable airframe advantageously represents a kind of "core"-structure or "nucleus" design that is modifiable with respect to a predetermined number of passengers, flight range, an intended kind of payload such as cargo, passengers and so on.

Moreover, in contrast to conventional aircraft airframes, the inventive design concept for the airframe is preferably compact and respective distances between masses and load/force introduction are low. Thus, the load carrying framework and the one or more preferably exchangeable covering items are mainly a connection of load introduction spots, e.g. landing gear, propulsion system carrying zone, thrust producing units etc., in a way that as much as possible the shortest load path is realized and as much as possible multiple (secondary) functions are taken and combined. Moreover, the load carrying framework advantageously separates several, essential regions in order to safely operate the aircraft even at system incidences, such as e.g. fire, leakages, foreign object damages, spark strikes, lightning strikes, electromagnetic pulses etc.

According to a further preferred embodiment, the at least one covering item is shaped to allow inflow of a cooling air stream at least into the second zone for cooling at least the electrical energy source.

According to a further preferred embodiment, the airframe comprises at least one frame that segregates the at least one load carrying section from the at least one propulsion system carrying section.

According to a further preferred embodiment, the electrical energy source is a high-voltage energy source.

According to a further preferred embodiment, the electrical energy source is exchangeable and comprises at least two exchangeable energy source units.

Advantageously, by enabling exchange of the exchangeable energy source units, the latter can easily be replaced with other exchangeable energy source units having different dimensions and/or energy values or with other energy sources having different energy contents. In particular, a respective selection can be made dependent on customer demands.

According to a further preferred embodiment, quick releases are provided that allow at least a quick release of the at least two exchangeable energy source units for removal of the at least two exchangeable energy source units from the aircraft.

According to a further preferred embodiment, the at least one load carrying section and the at least one propulsion system carrying section are segregated from each other in longitudinal direction of the aircraft.

According to a further preferred embodiment, at least four thrust producing units are provided, each being electrically powered by an associated electrical engine that is electrically connected to the electrical energy source via the electrical energy distribution system, the aircraft being implemented as a multicopter.

According to a further preferred embodiment, the aircraft is configured as a vertically taking off and landing air vehicle.

The present invention further provides an airframe for an aircraft that comprises at least one thrust producing unit, wherein the at least one thrust producing unit is electrically powered by an associated electrical engine that is electrically connected to an electrical energy source via an electrical energy distribution system. The airframe comprises at least one load carrying section and at least one propulsion system carrying section. The at least one load carrying section and the at least one propulsion system carrying section are segregated from each other. The at least one load carrying section is provided for transportation of passengers and/or cargo, and the at least one propulsion system carrying section is provided for carrying at least essentially the electrical energy source and the electrical energy distribution system.

According to one aspect, the inventive airframe is based on an entirely new concept for an aircraft's primary structure and, in particular, for a primary structure, i.e. a load carrying framework, of an aircraft with a high-voltage environment, in order to provide at least an improved stress loading on the aircraft, specifically in combination with any newly applicable requirements for electric flight. The stress loading is generated by forces of respectively provided propulsion pods, i.e. the electrical engine(s), as well as due to integration of a respective energy source, i.e. the electrical energy source(s), which is integrated into the inventive airframe. This generation of the stress loading is based on a currently applicable ruling of the competent authorities, i.e. the FAA, the EASA, or any other competent authorities, in order to prevent any harm to carried sensible objects, such as e.g. passengers, in case of hazardous events, such as e.g. a crash.

Advantageously, stress sensitive elements that are mounted on the inventive airframe, such as e.g. an energy distribution system and/or an energy source etc., are from a structure-mechanical view decoupled from respective main loads that may occur during flight maneuvers of a given aircraft that is provided with the inventive airframe. This decoupling from the respective main loads provides the basis for the easy-to-change new concept.

According to one aspect, the inventive airframe is modular and comprises an inner core structure, i.e. a load carrying framework, that carries all main loads and provides supports/loads introduction points for all main non-structural masses, such as a propulsion system, passenger and luggage compartments, which are preferably segregated into dedicated separate and at least partly interchangeable zones. This inner core structure, i.e. the load carrying framework, is preferentially at least divided into a load carrying section for passengers and/or cargo, and a propulsion system carrying section for the propulsion system.

Advantageously, by using such an inner core structure, use of several variants of outer covering items can be created and used to implement distinct models of a single base aircraft. In other words, provision of the load carrying framework and inter- and exchangeable covering items corresponds to provision of a so-called "platform design" for the inventive aircraft, i.e. a single baseline inner core structure fits to several kinds of aircraft design shapes. In other words, based on this platform design, passenger suited outer shapes as well as cargo suited shapes or pure unmanned aerial vehicle (UAV) shapes can be applied to a single load carrying framework structure without changing the baseline structure of the load carrying framework.

BRIEF DESCRIPTION OF THE DRAWINGS

Preferred embodiments of the invention are outlined by way of example in the following description with reference to the attached drawings. In these attached drawings, identical or identically functioning components and elements are

DETAILED DESCRIPTION OF THE INVENTION

Figure 1:
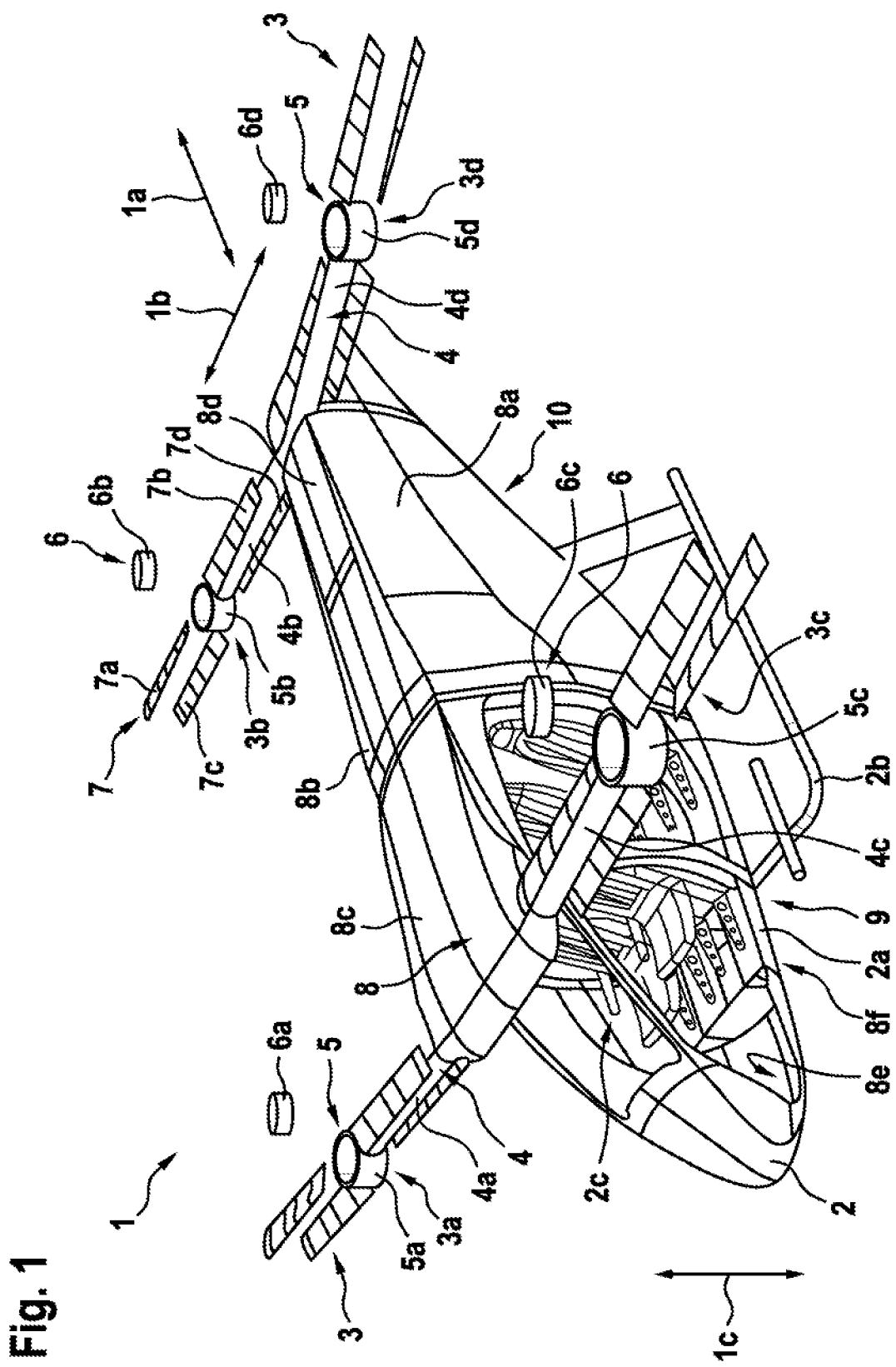
FIG. 1 shows a perspective view of an aircraft with a modular airframe according to an aspect of the present invention.

FIG. 1 shows an aircraft 1 with an aircraft airframe 2 according to the present invention. According to one aspect, the aircraft airframe 2 defines a modular supporting, i.e. primary structure that is also referred to hereinafter as the "modular airframe 2" of the aircraft 1. The modular airframe 2 illustratively exhibits an extension in longitudinal direction 1a, an extension in lateral direction 1b and an extension in vertical direction 1c, wherein the directions 1a and 1b define a horizontal plane of the aircraft 1 and the directions 1a and 1c respectively 1b and 1c define vertical planes of the aircraft 1.

By way of example, the aircraft 1 is a multirotor aircraft, in particular a vertically taking off and landing (VTOL) air vehicle and, more particularly, a multicopter. More specifically, according to one aspect the aircraft 1 comprises a plurality of thrust producing units 3, which are only schematically illustrated. Preferably, the plurality of thrust producing units 3 comprises at least two and preferentially four thrust producing units 3a, 3b, 3c, 3d. The thrust producing units 3a, 3b, 3c, 3d are embodied for producing thrust in operation, such that the aircraft 1 is able to hover in the air as well as to fly in any forward or rearward direction.

Preferably, the thrust producing units 3a, 3b, 3c, 3d are structurally connected to the modular airframe 2. By way of example, this is achieved by means of a plurality of structural supports 4. More specifically, the thrust producing unit 3a is preferably connected to the airframe 2 via a structural support 4a, the thrust producing unit 3b via a structural support 4b, the thrust producing unit 3c via a structural support 4c and the thrust producing unit 3d via a structural support 4d. The structural supports 4a, 4b, 4c, 4d define the plurality of structural supports 4.

The plurality of structural supports 4 preferably includes a plurality of engine accommodations 5 for a plurality of engines 6 that are associated with the plurality of thrust producing units 3. More specifically, the structural support 4a preferably includes an engine accommodation 5a for an engine 6a that is associated with the thrust producing unit 3a, the structural support 4b an engine accommodation 5b for an engine 6b that is associated with the thrust producing unit 3b, the structural support 4c an engine accommodation 5c for an engine 6c that is associated with the thrust producing unit 3c, and the structural support 4d an engine accommodation 5d for an engine 6d that is associated with the thrust producing unit 3d. The engine accommodations 5a, 5b, 5c, 5d illustratively define the plurality of engine accommodations 5 and the engines 6a, 6b, 6c, 6d illustratively define the plurality of engines 6.

According to one aspect, the engines 6a, 6b, 6c, 6d are electrical engines, i.e. electrically powered engines. Preferably, each one of the electrical engines 6a, 6b, 6c, 6d is provided for powering an associated one of the thrust producing units 3a, 3b, 3c, 3d and, more specifically, at least one and, illustratively, two associated rotor assemblies thereof. By way of example, the electrical engine 6b is provided for powering two rotor assemblies. Therefore, the electrical engine 6b is preferably connected to a plurality of rotor blades 7. More specifically, two rotor blades 7a, 7b of the plurality of rotor blades 7 illustratively define a first rotor assembly and two other rotor blades 7c, 7d of the plurality of rotor blades 7 illustratively define a second rotor assembly, both of which are illustratively operated by means of the electrical engine 6b. However, for simplicity and clarity of the drawings, only the rotor blades 7a, 7b, 7c, 7d of the thrust producing unit 3b are labeled.

It should be noted that although the aircraft 1 is described above with reference to a multirotor structure with multiple rotor assemblies, it could likewise be implemented as a multipropeller structure with multiple propeller assemblies or as a multipropeller and -rotor structure. More specifically, while rotors are generally fully articulated, propellers are generally not articulated at all. However, both can be used for generating thrust and, thus, for implementing the thrust producing units 3a, 3b, 3c, 3d. Consequently, any reference to rotors or rotor structures in the present description should likewise be understood as a reference to propellers and propeller structures, so that the inventive aircraft 1 can likewise be implemented as a multipropeller and/or multipropeller and -rotor aircraft. Furthermore, not only multirotor and/or multipropeller aircrafts, but also other aircrafts, such as fixed-wing aircrafts or rotary wing aircrafts in general, as well as space crafts etc., are likewise contemplated as all these air vehicles can be provided with a modular airframe according to the present invention, such as the modular airframe 2.

According to one aspect, the modular airframe 2 has a basic primary structure that is built-up by a load carrying framework 2a. Preferably, the load carrying framework 2a allows implementation of an efficient load path between occurring structural loads of the plurality of thrust producing units 3.

Illustratively, the modular airframe 2 is connected to a landing gear 2b, which is only by way of example, and not necessarily, embodied as a skid-type landing gear. Preferably, the landing gear 2b is connectable and, exemplarily, rigidly mounted to the load carrying framework 2a of the modular airframe 2. Furthermore, the modular airframe 2 preferentially defines at least one cabin 2c and/or a luggage and/or cargo compartment (17 in FIG. 3).

Preferably, at least one exchangeable covering item, which may be fully or partly load carrying, is detachably mounted to the load carrying framework 2a. According to one aspect, a plurality of exchangeable covering items 8 is detachably mounted to the load carrying framework 2a. By way of example, this plurality of exchangeable covering items 8 includes at least one and, preferentially, at least two exchangeable energy source cover structural shells 8a, 8b, at least one exchangeable upper deck structural shell 8c, at least one exchangeable upper core structural shell 8d, at least one exchangeable bottom structural shell 8e and/or at least one exchangeable lower core structural shell 8f.

According to one aspect, the at least two exchangeable energy source cover structural shells 8a, 8b cover the exchangeable energy source 11. The at least one exchangeable upper core structural shell 8c is preferably adapted for stiffening of the modular airframe 2. It preferentially transfers shear loads in the horizontal plane of the aircraft 1 and contributes to torsional stiffness of the modular airframe 2. The at least one exchangeable upper deck structural shell 8d preferably transfers shear loads in the horizontal plane of the aircraft 1, which result from lateral load coming from the plurality of thrust producing units 3, as well as gusts or other sideward loads. The at least one exchangeable bottom structural shell 8e preferably generates torsional stiffness of a respective cabin floor provided in the cabin 2c and serves as lower flange plate to increase bending inertia. The at least one exchangeable lower core structural shell 8f preferably stiffens the modular airframe 2. It preferentially transfers shear loads and contributes to torsional stiffness of the modular airframe 2.

Accordingly, respective outer surfaces of the aircraft 1 are in wide areas insensitive to damages since they act as covers only. In particular, damages are acceptable because the load carrying framework 2a is surrounded and shielded by the plurality of exchangeable covering items 8, as well as other systems, installations and (aerodynamic) fairings, as e.g. described below with reference to FIG. 2. Accordingly, repair times, inspection times, etc. can be reduced.

Furthermore, according to one aspect the load carrying framework 2a defines at least one load carrying section 9 and at least one propulsion system carrying section 10 that are segregated from each other. The at least one load carrying section 9 is preferably at least provided for transportation of passengers and, more generally, provided for accommodation of load that is to be transported by the inventive aircraft 1, such as passengers, luggage, cargo, equipment, cockpit equipment etc., and, therefore, preferentially encompasses at least the cabin 2c. The at least one propulsion system carrying section 10 is described in more detail below.

In other words, the inventive aircraft 1 is preferably separated, respectively segregated, in dedicated zones in order to be modular, hence, being adaptable to respective demands of customers/missions/business cases. This separation, respectively segregation, is advantageously applied between a preferably high-voltage power supply and energy source and at least one passenger compartment. The intention of the segregation into the dedicated zones is that in case of an incident, such as e.g. a crash or hard landing of the aircraft 1, any harmful equipment contained in the at least one propulsion system carrying section 10 must at least be prevented from endangering passengers of the aircraft 1.

Figure 2:
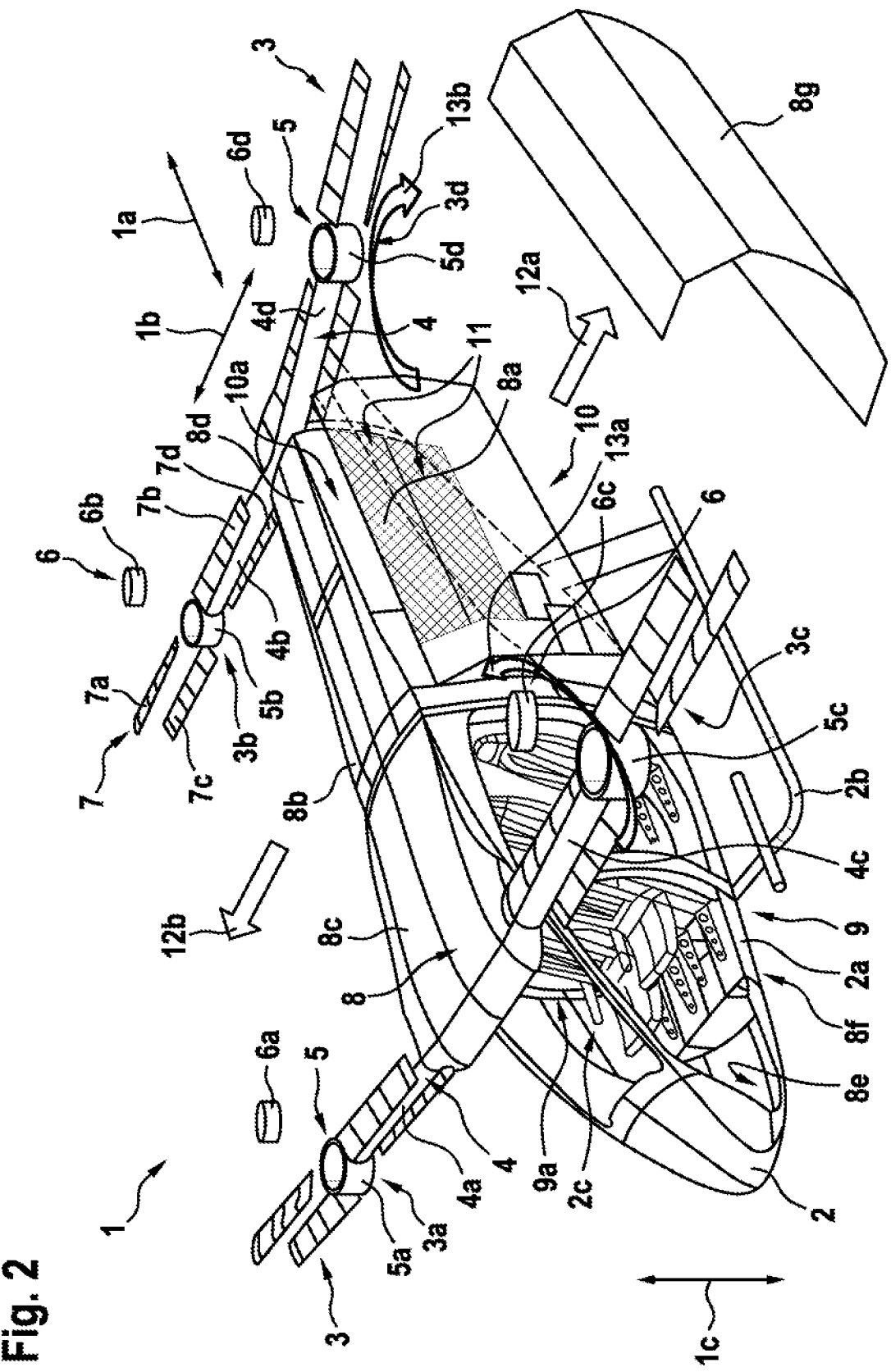
FIG. 2 shows the aircraft of FIG. 1 with an exchangeable covering item.

FIG. 2 shows the aircraft 1 of FIG. 1 with the modular airframe 2 that comprises the load carrying framework 2a and the plurality of exchangeable covering items 8. As mentioned above, the load carrying framework 2a defines at least one load carrying section 9 and at least one propulsion system carrying section 10 that are segregated from each other. Preferably, the at least one load carrying section 9 and the at least one propulsion system carrying section 10 are segregated from each other in the longitudinal direction 1a of the aircraft 1.

Preferably, the at least one load carrying section 9 is built up by an associated framework section 9a of the load carrying framework 2a and the at least one propulsion system carrying section 10 is built up by an associated framework section 10a of the load carrying framework 2a. Both framework sections 9a, 10a are preferably at least rigidly attached to each other or, alternatively, integrally formed as a one-piece component.

According to one aspect, the framework section 10a and, more generally, the at least one propulsion system carrying section 10 is provided for carrying at least essentially propulsion system components. Illustratively, these propulsion system components include at least one, preferably but not necessarily exchangeable, energy source 11. The latter is preferentially embodied as a high-voltage energy source.

The exchangeable energy source 11 is preferably arranged between the load carrying framework 2a and, more specifically, the framework section 10a, and the exchangeable energy source cover structural shell 8a. Preferentially, at least a portion of the exchangeable energy source 11 is arranged between the load carrying framework 2a and, more specifically, the framework section 10a, and the exchangeable energy source cover structural shell 8b, as illustrated by way of example in FIG. 4.

According to one aspect, the exchangeable energy source cover structural shell 8a exhibits a predetermined shaping. Preferably, the exchangeable energy source cover structural shell 8a is at least shaped to allow inflow of a cooling air stream 13a into the at least one propulsion system carrying section 10 for cooling at least the exchangeable energy source 11. Thereby, convection cooling on the surface of the exchangeable energy source 11 is favourable.

By way of example, the cooling air stream 13a may enter the at least one propulsion system carrying section 10 in a region close to the at least one load carrying section 9 and exit the at least one propulsion system carrying section 10, i.e. the exchangeable energy source cover structural shell 8a, in an aft region of the modular airframe 2, as indicated with an arrow 13b. Preferably, the exchangeable energy source cover structural shell 8b has a similar shaping.

Preferably, by dismounting the exchangeable energy source cover structural shell 8a, which is detachably mounted to the load carrying framework 2a, i.e. the framework section 10a, from the modular airframe 2 in an exemplary dismounting direction 12a, mounting of a substitute exchangeable covering item 8g, i.e. another exchangeable energy source cover structural shell 8g, to the load carrying framework 2a, i.e. the framework section 10a, is enabled. The other exchangeable energy source cover structural shell 8g may e.g. exhibit another predetermined shaping than the exchangeable energy source cover structural shell 8a. This likewise applies to the exchangeable energy source cover structural shell 8b, which is also detachably mounted to the load carrying framework 2a, i.e. the framework section 10a, and which can be dismounted from the modular airframe 2 in an exemplary dismounting direction 12b.

By way of example, the exchangeable energy source cover structural shell 8g has a shaping that is more cambered than the shaping of the exchangeable energy source cover structural shell 8a. Thus, the exchangeable energy source cover structural shell 8g may e.g. be used when using an exchangeable energy source that exhibits greater dimensions than the illustrated exchangeable energy source 11. This advantageously allows a mission-specific adaptation of the inventive modular airframe 2, e.g. to missions with different range requirements, with respect to passenger transport, luggage transport only, rescue missions, etc. Moreover, this allows several propulsive principles, such as e.g. a single-layout, dual-layout, tri-layout, quad-layout, octo-layout.

Furthermore, by replacing selected covering items of the plurality of exchangeable covering items 8 with substitute covering items that may exhibit different shapes, a customization of the inventive aircraft 1 in general can be achieved. In other words, by enabling mounting of covering items with different shapes to the load carrying framework 2a, the latter can advantageously be used as a basic primary structure for different aircraft types/models. Thus, the load carrying framework 2a defines a single baseline inner core structure that fits to several kinds of aircraft design shapes. This provides the opportunity to quickly change an underlying style of the aircraft 1 and to provide for a comparatively simple access to all items on the aircraft 1 that may require maintenance. More generally, it offers a quick turn-around performance in general.

More specifically, according to one aspect the exchangeable energy source is independent in its geometrical sizing regarding the load carrying framework 2a. Only respective interface positions have to be kept to guarantee a desired interchangeability. Furthermore, the exchangeable energy source 11 is preferably applied in such a manner that it is not or preferably only minimally affected by stress loading of the aircraft 1. Moreover, the exchangeable energy source 11 preferentially does not protrude into the cabin 2c in general and, preferably, even not in case of a crash of the aircraft 1. Thus, the exchangeable energy source 11 is efficiently separated from any passengers in the cabin 2c during operation of the aircraft 1 and in case of a crash.

Also, any potential failure conditions of the exchangeable energy source 11 that may e.g. lead to a thermal runaway, can be handled easier, as its power components, such as e.g. rechargeable battery cells, where respective destructive energy may be released, are segregated in the framework section 10a of the at least one propulsion system carrying section 10 and, thus, kept away from the framework section 9a of the at least one load carrying section 9, respectively from the cabin 2c. In addition, different energy storing and/or generating concepts can be implemented and applied, such as e.g. rechargeable battery cells, fuel cells, fuel tanks, range extenders, etc.

Figure 3:
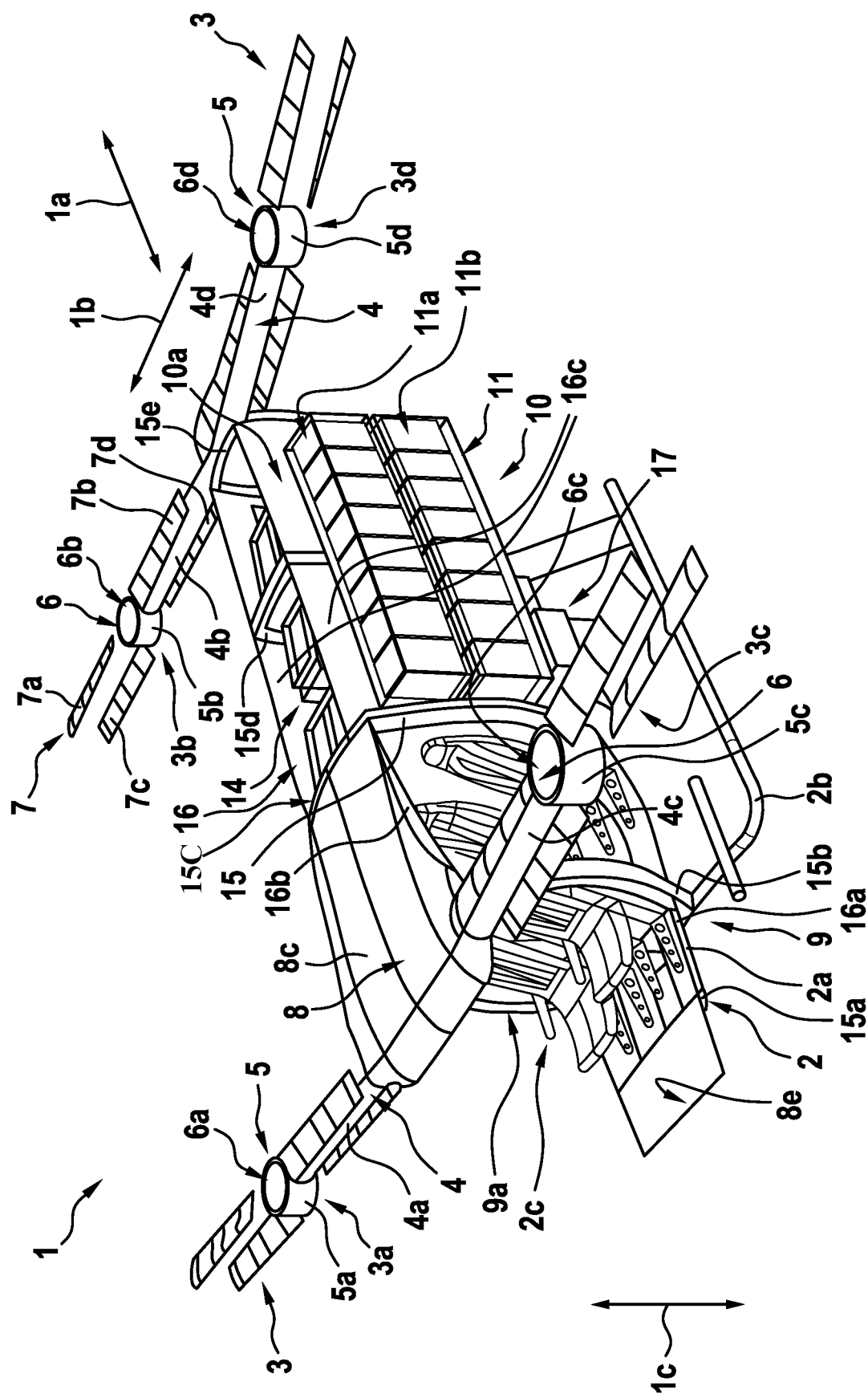
FIG. 3 shows the aircraft of FIG. 1 and FIG. 2 without exchangeable covering items.

FIG. 3 shows the aircraft 1 with the modular airframe 2 of FIG. 1 and FIG. 2. However, for further illustrating the cabin 2c of FIG. 1 and FIG. 2, illustration of a respective cockpit frame that is shown in a front portion of the aircraft 1 of FIG. 1 and FIG. 2 and that can be implemented as an integral portion of the modular airframe 2 or, alternatively, be rigidly attached thereto, is omitted. Furthermore, illustration of the exchangeable energy source cover structural shells 8a, 8b and the exchangeable upper core structural shell 8d of FIG. 1 and FIG. 2 is also omitted for illustrating an exemplary configuration of the at least one propulsion system carrying section 10 that is provided for carrying at least essentially propulsion system components, such as the at least one exchangeable energy source 11.

As described above, the exchangeable energy source 11 is preferably arranged at the framework section 10a of the load carrying framework 2a. Preferably, the exchangeable energy source 11 comprises at least two exchangeable energy source units 11a, 11b, both of which are illustratively arranged at the framework section 10a. By way of example, the exchangeable energy source units 11a, 11b are implemented by rechargeable batteries, preferably rechargeable high-voltage batteries, and arranged laterally on a board side region of the modular airframe 2, i.e. the load carrying framework 2a. Alternatively, they may be arranged on the starboard side region of the modular airframe 2, i.e. the load carrying framework 2a, and/or additional exchangeable energy source units may be installed in the starboard side region, as already mentioned above.

It should be noted that by using the exchangeable energy source 11 with the exchangeable energy source units 11a, 11b, there is no longer the usually strong need to bear e.g. fuel inside a crash-worthy cavity inside of the modular airframe 2. However, instead a need arises for a very quick exchangeability of the exchangeable energy source units 11a, 11b, as even quick charging usually takes too much time, as described above. Also, other exchangeable energy source units with higher capacity may be required to increase an underlying flight mission range of the aircraft 1 in combination with decreased payload, as described below.

According to one aspect, the load carrying framework 2a has a plurality of vertical frames 15, i.e. frames that span at least approximately a plane in the lateral direction 1b and the vertical direction 1c of the aircraft 1. The plurality of vertical frames 15 illustratively includes five vertical frames 15a, 15b, 15c, 15d, 15e, but preferably includes at least one vertical frame, exemplarily the vertical frame 15c, that segregates the at least one load carrying section 9 from the at least one propulsion system carrying section 10.

More specifically, the vertical frame 15a preferably supports a respective cabin floor provided in the cabin 2c and, further, defines a support of the at least one exchangeable lower core structural shell 8f. Furthermore, it preferentially provides torsional stiffening of a respective front portion of the modular airframe 2. The vertical frame 15b preferably transfers loads between the modular airframe 2 and associated propulsion system components, such as e.g. the thrust producing units 3a, 3c, as well as between the modular airframe 2 and the landing gear 2b. Preferentially, the vertical frame 15b defines a direct link between the landing gear 2b and respective masses of the thrust producing units 3a, 3c. The vertical frame 15c preferably defines a load introduction point for the at least one propulsion system carrying section 10. Furthermore, it preferentially provides support for the load carrying framework 2a in general. The vertical frame 15d preferably transfers loads between the modular airframe 2 and the landing gear 2b. It preferentially also provides support for the load carrying framework 2a in general. The vertical frame 15e preferably also defines a load introduction point for the at least one propulsion system carrying section 10 and transfers loads between the modular airframe 2 and associated propulsion system components, such as e.g. the thrust producing units 3b, 3d, as well as between the modular airframe 2 and the landing gear 2b. Preferentially, the vertical frame 15d defines a direct link between the landing gear 2b and respective masses of the thrust producing units 3b, 3d.

Furthermore, the load carrying framework 2a has a plurality of longerons 16, i.e. longerons that span at least approximately a plane in the longitudinal direction 1a and the vertical direction 1c of the aircraft 1. The plurality of longerons 16 illustratively includes six longerons 16a, 16b, 16c, two lower longitudinal front longerons 16a, two upper longitudinal front longerons 16b and two longitudinal rear longerons 16c.

The longerons 16a preferably transfer load between the modular airframe 2 and the landing gear 2b, respectively between the modular airframe 2 and the at least one propulsion system carrying section 10. Furthermore, they preferentially provide support for a respective cabin floor provided in the cabin 2c and, further, define a support of the at least one exchangeable lower core structural shell 8f. The longerons 16b preferably transfer loads at least between the thrust producing units 3a, 3c and the modular airframe 2. They preferentially provide support for roof and cabin structure. The longerons 16c preferably provide the global load path for shear loads in the vertical plane of the aircraft 1. They preferentially serve as separators between the exchangeable energy source 11 and the energy distribution system 14.

As already mentioned above with respect to FIG. 2, the load carrying framework 2a is preferably not only adapted for accommodation of the exchangeable energy source 11, but also for accommodation of other propulsion system components. By way of example, an energy distribution system 14 is provided that is at least configured for connecting the exchangeable energy source 11 to the plurality of electrical engines 6 of the plurality of thrust producing units 3. Preferably, the energy distribution system 14 comprises electrical components such as boxes, fuses, a battery management system, wiring, connectors, fuses, etc. However, it should be noted that also other propulsion system components, such as e.g. electrical equipment in general, may be provided.

The energy distribution system 14 is preferably also accommodated in the at least one propulsion system carrying section 10, i.e. the framework section 10a. However, according to one aspect, the energy distribution system 14 is separated from the exchangeable energy source 11 in the at least one propulsion system carrying section 10, i.e. the framework section 10a of the load carrying framework 2a, by means of the longeron(s) 16c.

According to one aspect, the load carrying framework 2a further provides a luggage and/or cargo storage 17 for luggage and/or cargo. The luggage and/or cargo storage 17 is preferably at least segregated from the at least one load carrying section 9, i.e. the framework section 9a of the load carrying framework 2a, by means of the vertical frame 15c.

It should be noted that the load carrying framework 2a is at least in wide areas surrounded and shielded by the propulsion system components and the plurality of exchangeable covering items 8, so that the load carrying framework 2a as such is not endangered by in-service damages. This leads to a reduced amount of repairs, less severe repairs and in addition a possible weight saving in realization of the load carrying framework 2a.

Figure 4:
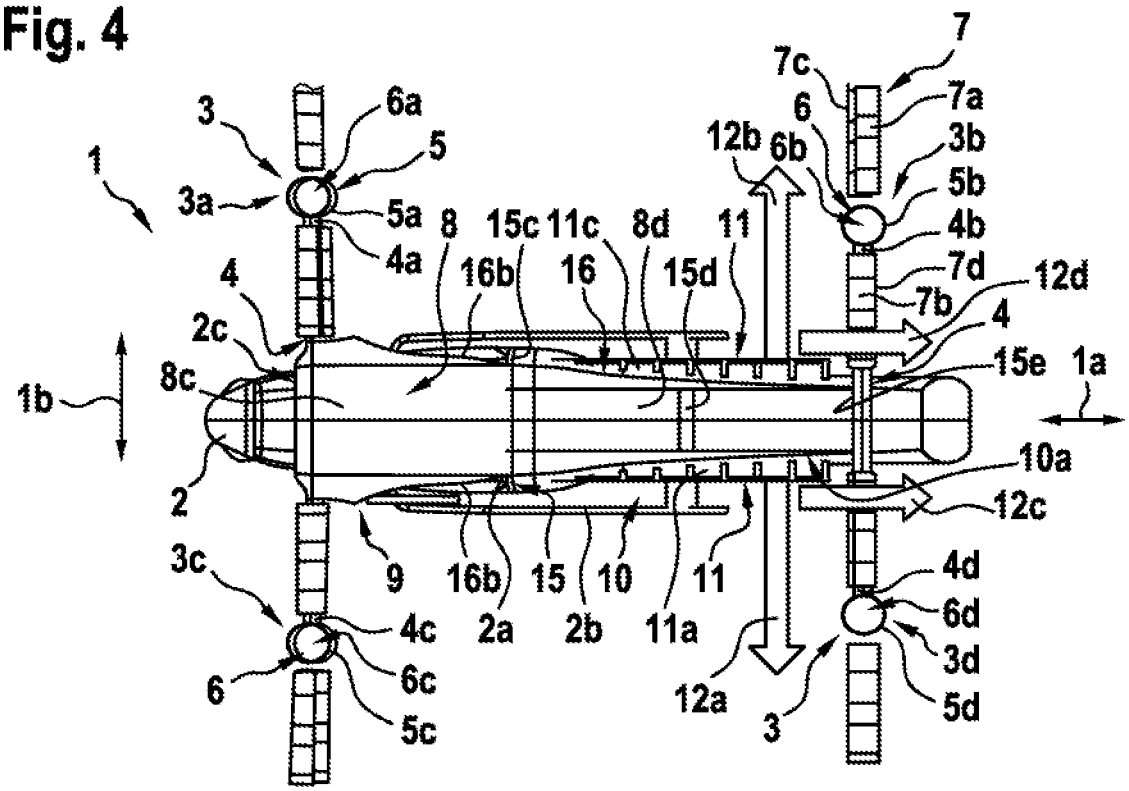
FIG. 4 shows a top view of the aircraft of FIG. 1 and FIG. 2.

FIG. 4 shows the aircraft 1 with the modular airframe 2 of FIG. 1 to FIG. 3 for further illustrating an exemplary arrangement of the exchangeable energy source 11 on both sides of the modular airframe 2, i.e. the board side region and the starboard side region of the modular airframe 2. As described above with reference to FIG. 3, the exchangeable energy source units 11a, 11b are arranged laterally on the board side region of the modular airframe 2 and, in FIG. 4, exemplarily at least an exchangeable energy source unit 11c is arranged on the board side region of the modular airframe 2.

As described above with reference to FIG. 2, possible dismounting directions for the exchangeable energy source units 11a, 11b and the exchangeable energy source unit 11c are illustrated with arrows 12a, 12b, respectively. Alternative dismounting directions are labelled with arrows 12c, 12d, respectively. However, it should be noted that combined dismounting directions and movements are likewise contemplated.

Figure 5:
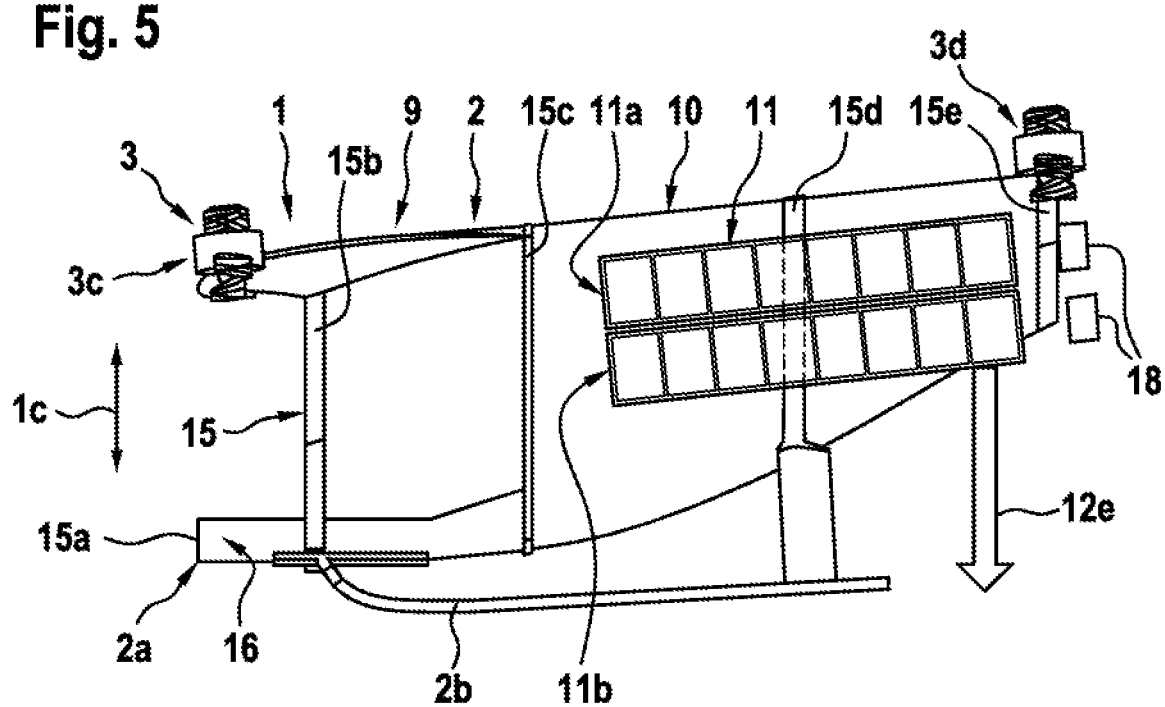
FIG. 5 shows a side view of the aircraft of FIG. 3.

FIG. 5 shows the aircraft 1 with the modular airframe 2 according to FIG. 3 for further illustrating the plurality of vertical frames 15 and the exchangeable energy source units 11a, 11b of the exchangeable energy source 11. The exchangeable energy source units 11a, 11b are mounted to the load carrying framework 2a of the modular airframe 2 in the at least one propulsion system carrying section 10. Furthermore, an exemplary additional possible dismounting direction for the exchangeable energy source units 11a, 11b (and the exchangeable energy source unit 11c of FIG. 4) is illustrated with an arrow 12e.

According to one aspect, quick releases 18 are provided that allow at least a quick release of the exchangeable energy source units 11a, 11b for removal of the exchangeable energy source units 11a, 11b from the aircraft 1. Illustratively, the quick releases 18 are arranged at a rear part of the modular airframe 2. Thus, mount and dismount of the exchangeable energy source 11 is improved and suitable for a quick exchange. The quick releases 18 may be rigid as well as flexible in order to de-couple unnecessary stress acting on the exchangeable energy source 11.

However, it should be noted that suitable quick releases for implementing the quick releases 18 are well-known to the person skilled in the art, who is readily aware of possible, suitable locations provided there for at the modular airframe 2, so that a detailed description thereof can be omitted for brevity and conciseness. Furthermore, it should be noted that the quick releases 18 can be provided with, or associated with, respective rated breaking points that are provided as an option in case of a crash incident. Thus, a potential destructive energy release, such as e.g. a thermal runaway at the exchangeable energy source units 11a, 11b due to a respective crash impact can be kept away from the load carrying section 9 and, thus, away from the passengers. Furthermore, by using standardized electrical and mechanical interfaces as well as respective mounting fixtures between the exchangeable energy source 11 and the load carrying framework 2a, a full interchangeability of the exchangeable energy source 11 can be guaranteed.

Advantageously, the exchangeable energy source 11, i.e. the exchangeable energy source units 11a, 11b (and the exchangeable energy source unit 11c of FIG. 4), is arranged such that it can easily be released in case of a crash of the aircraft 1. Furthermore, it is stored crashworthy and cooled efficiently due to its storage principle close to an outer surface of the aircraft 1, and not inside, i.e. in the interior of the load carrying framework 2a, preferably with a predetermined clearance to the load carrying framework 2a in order to allow venting if required.

Moreover, the exchangeable energy source 11, i.e. the exchangeable energy source units 11a, 11b (and the exchangeable energy source unit 11c of FIG. 4), is de-coupled structurally such that respective aircraft loads do not affect it. In addition, due to the encased positioning in the framework section 10a of the at least one propulsion system carrying section 10 of FIG. 2, as described above with reference to FIG. 2, it is not sensitive against damage caused by foreign objects, it does not protrude into a respective passenger or luggage compartment in case of a crash or hard landing of the aircraft 1, it is protected beneficially against environmental harsh, such as wind, hail, snow, rain etc., and it is placed beneficially in order to be replaced quickly.

Figure 6:
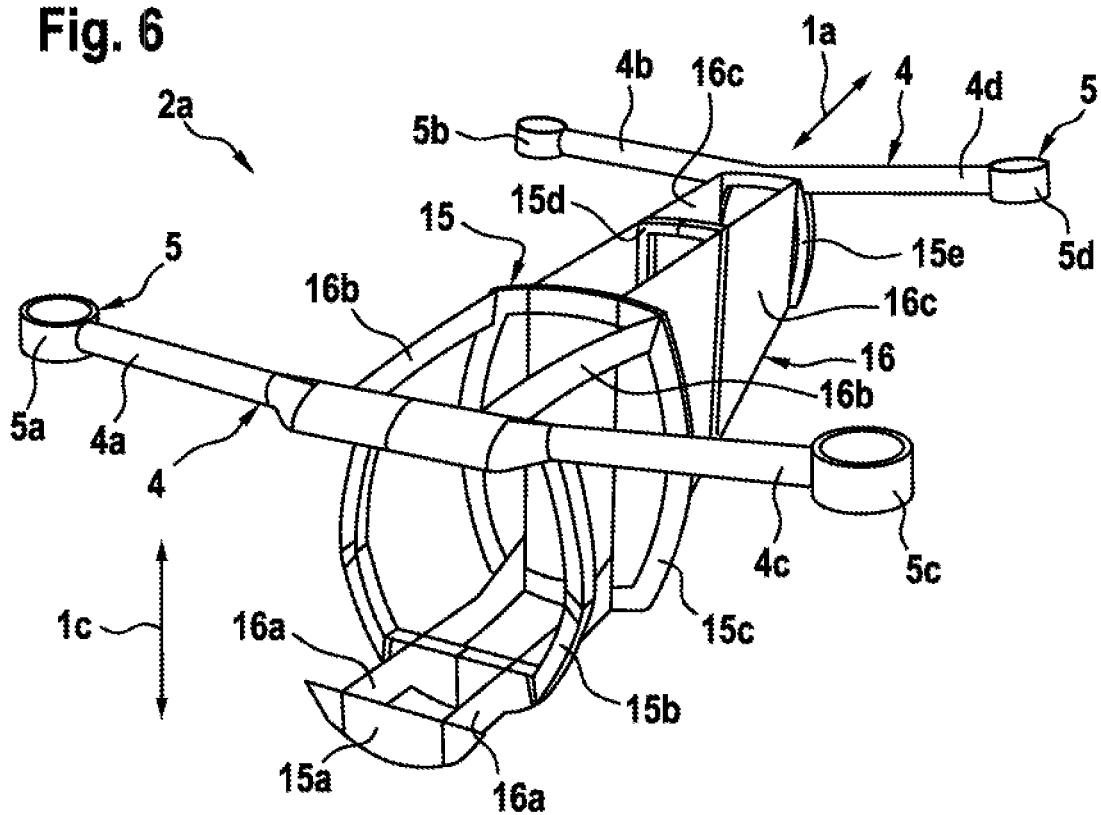
FIG. 6 shows a perspective view of the modular airframe of FIG. 1 without exchangeable covering items.

FIG. 6 shows the load carrying framework 2a of the modular airframe 2 of FIG. 3 and FIG. 4 for further illustrating the plurality of vertical frames 15 and the plurality of longerons 16, as well as the plurality of structural supports 4 that includes the plurality of engine accommodations 5. FIG. 6 clarifies the inventive concept of provision of a baseline inner core structure, i.e. the load carrying framework 2*a*, that is illustratively implemented in form of a framework skeleton. Such a framework skeleton allows implementation of a weight- and cost-efficient primary structure, in particular for any aerial vehicle that comprises more than one rotor. Furthermore, only a minimal breakthrough in the load carrying framework 2*a* is necessary, leading to reduced costs, complexity and weight and minimizing assembly effort.

The inventive design of the baseline inner core structure with the load carrying framework 2*a* enables a safe behaviour of the exchangeable energy source 11 of FIG. 3 and FIG. 4, e.g. in case of a crash or hard landing of the aircraft 1 of FIG. 3 and FIG. 4, as in combination with a predetermined breaking part the exchangeable energy source 11 can be separated from the load carrying framework 2*a* automatically, e.g. by shearing off at a given interface to the load carrying framework 2*a* and falling down, while keeping its respective, preferably provided encapsulation/insulation and without hurting or endangering passengers of the aircraft 1. As opposed to the conventional design of fuel tanks, the load carrying framework 2*a* does not have to withstand the high forces generated in case of crash, it can advantageously be built in a more lightweight way. However, special damping or energy dissipating devices can be installed at the interfaces provided by the load carrying framework 2*a*, thus, allowing in the event of a big strike to reduce impact on the load carrying framework 2*a* and its structural integrity.

Figure 7:
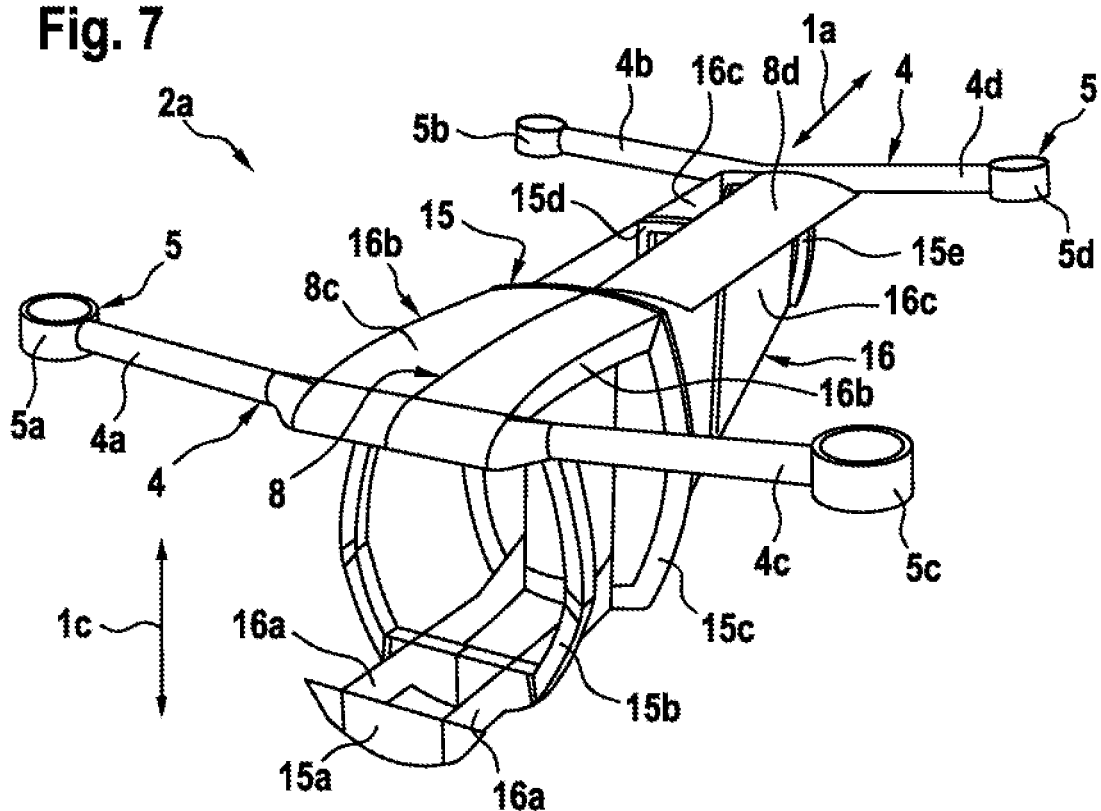
FIG. 7 shows the modular airframe of FIG. 6 with one exchangeable covering item.

FIG. 7 shows the load carrying framework 2*a* of the modular airframe 2 according to FIG. 6 with the plurality of vertical frames 15 and the plurality of longerons 16, as well as the plurality of structural supports 4 that includes the plurality of engine accommodations 5. FIG. 7 clarifies an exemplary customization of the modular airframe 2 by the mounting of selected structural shells of the plurality of exchangeable covering items 8 to the load carrying framework 2*a*. By way of example, selected upper deck and upper core structural shells 8*c*, 8*d* with predetermined shapes are mounted to the load carrying framework 2*a*.

Accordingly, a very simple access to the load carrying framework 2*a* and/or primary systems, such as the exchangeable energy source 11 of FIG. 1 to FIG. 5, can be guaranteed due to comparatively quick removable outer parts, i.e. the plurality of exchangeable covering items 8, which advantageously reduces turn-around time or time/cost for maintenance. More specifically, the load carrying framework 2*a* may normally remain untouched, while all removable items such as the exchangeable energy source 11, e.g. rechargeable battery cells, fuel cells or also fuel tanks, range extenders, possible luggage or cargo compartments, etc. can be maintained or exchanged easily by means of access via the plurality of exchangeable covering items 8.

Furthermore, an underlying design concept of the load carrying framework 2*a* can be re-used even if a given concept of implementation of the exchangeable energy source is changed. In other words, in future scenarios the load carrying framework 2*a* can remain unchanged and instead of e.g. rechargeable batteries, fuel cells or other future energy storage devices can be installed. In this sense, the underlying design concept even fulfils environment friendly aspects.

Figure 8:
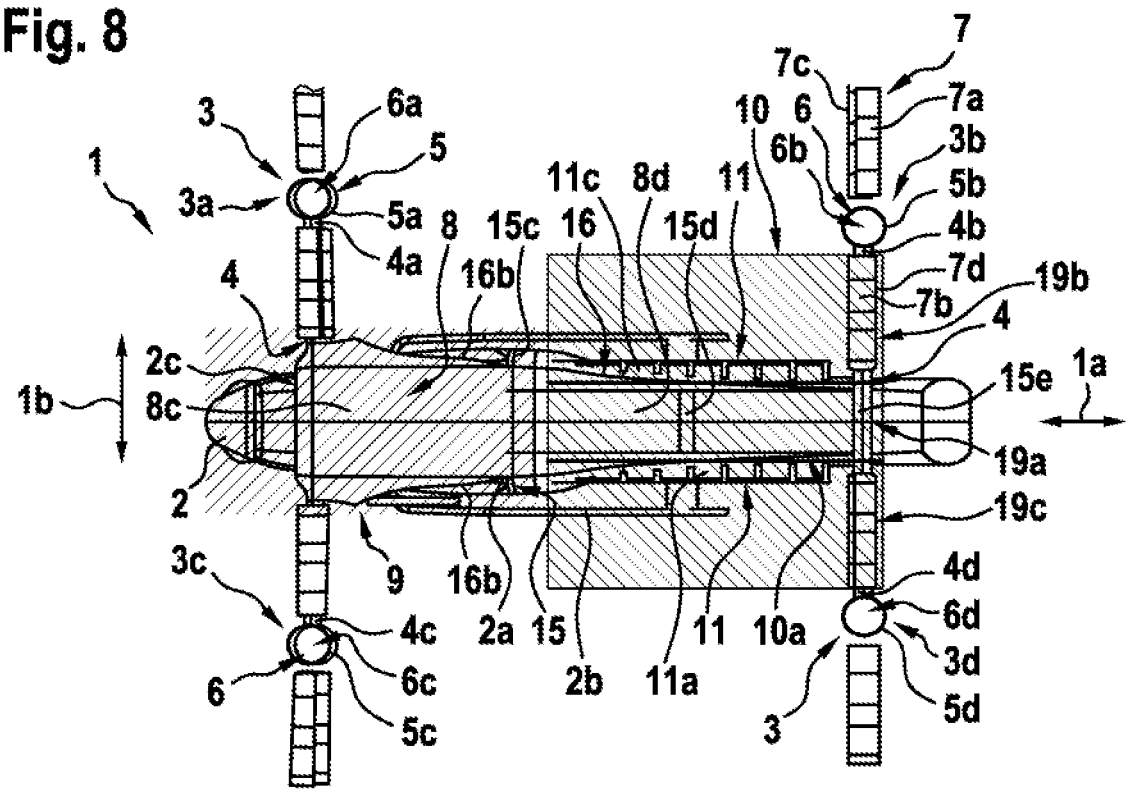
FIG. 8 shows a top view of the aircraft of FIG. 4 with several zones according to an aspect of the present invention.

FIG. 8 shows the aircraft 1 with the modular airframe 2 of FIG. 1 to FIG. 3 with the exchangeable energy source 11 that is arranged on both sides of the modular airframe 2 as described above with reference to FIG. 4. The modular airframe 2 has the load carrying framework 2*a* with the plurality of vertical frames 15 and the plurality of longerons 16 as described above with reference to FIG. 3.

According to one aspect, the plurality of longerons 16 includes at least one longeron, exemplarily one of the longerons 16*c*, which divides the load carrying framework 2*a* and, more specifically, the framework section 10*a* and, thus, the at least one propulsion system carrying section 10, at least into a first zone 19*a* and a second zone 19*b*. Preferably, the first zone 19*a* and the second zone 19*b* are segregated from each other by means of the one of the longerons 16*c*. The first zone 19*a* is preferably provided for carrying the energy distribution system 14 of FIG. 3 and the second zone 19*b* is preferably provided for carrying the exchangeable energy source 11. Illustratively, the second zone 19*b* carries the exchangeable energy source unit 11*c*.

Preferably, the at least one propulsion system carrying section 10 further comprises at least one third zone 19*c* that is segregated from the first zone 19*a*. The at least one third zone 19*c* is preferentially provided for carrying at least a portion of the exchangeable energy source 11. Illustratively, the third zone 19*c* carries the exchangeable energy source unit 11*a* (and 11*b* of FIG. 3).

It should be noted that the at least one third zone 19*c* is preferably at least partly arranged between the load carrying framework 2*a* and the at least one covering item 8*a* of FIG. 1 and FIG. 2. Likewise, the second zone 19*b* is preferably at least partly arranged between the load carrying framework 2*a* and the at least one covering item 8*b* of FIG. 1 and FIG. 2. Due to the integration of the at least one third zone 19*c* and the second zone 19*b* within the covering items 8*a*, 8*b* on the load carrying framework 2*a*, an ease of operation and improved operational safety is provided.

It should further be noted that FIG. 8 is intended to clarify a zonal approach according to the present invention. More specifically, according to this zonal approach and as already described above, the modular airframe 2 is divided into the at least one load carrying section 9 and the at least one propulsion system carrying section 10. The at least one load carrying section 9 and the at least one propulsion system carrying section 10 are segregated and separated from each other by means of the vertical frame 15*c*.

Furthermore, the at least one propulsion system carrying section 10, which carries all propulsion system components, is divided into at least two and, illustratively, three separate zones 19*a*, 19*b*, 19*c*. The three separate zones 19*a*, 19*b*, 19*c* are segregated and separated from each other by means of the longerons 16*c*, so that also the exchangeable energy source 11 and the energy distribution system 14 are separated from each other. Thus, the aircraft 1 with the inventive modular airframe 2 is suitable and adapted for being certified by the FAA, EASA and/or other aviation authority ruling.

By arranging lifetime afflicted parts, such as the exchangeable energy source 11, in the externally located zones 19*b*, 19*c*, which are physically divided from all further components/fixed part of the propulsion system components, in particular the energy distribution system 14, which e.g. comprises electronics, monitoring/control functions, protection functions, etc. and which is located in the inner zone 19*a*, required maintenance actions linked to the aging, i.e. wear and tear, of the exchangeable energy source 11 can be simplified and performed more efficiently. Furthermore, a simple interchangeability of these lifetime afflicted parts in the externally located zones 19*b*, 19*c* disburdens different commercial concepts like sharing, loaning, etc. of the exchangeable energy source 11. Moreover, the easy interchangeability of the exchangeable energy source 11 from the externally located zones 19b, 19c enables short down times of the aircraft 1. Besides on-board re-fuelling/re-charging of the empty exchangeable energy source 11, an exchange with another fully charged energy source can be offered. Thus, down time of the aircraft 1 merely equals time to exchange the exchangeable energy sources.

It should be noted that the zones 19b, 19c are described above as being provided for respectively carrying at least portions of the exchangeable energy source 11. However, they may alternatively or in addition also carry further aircraft essential items, such as e.g. air-conditioning, low voltage electrical equipment, avionics equipment, etc., or even operational items, such as e.g. luggage.

Figure 9:
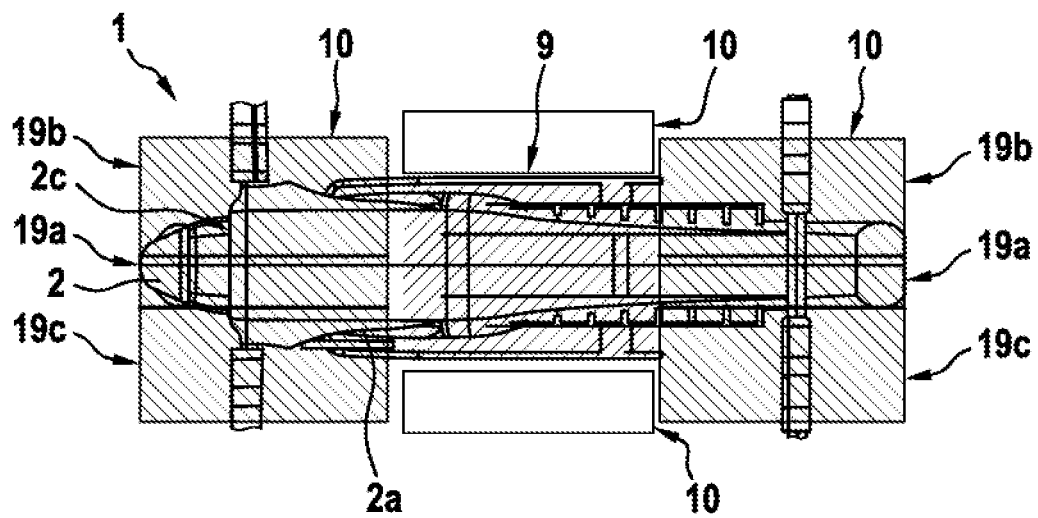
FIG. 9 shows a top view of the aircraft of FIG. 4 with several zones according to another aspect of the present invention.

FIG. 9 shows the aircraft 1 with the modular airframe 2 of FIG. 8. However, instead of dividing the modular airframe 2 into a single load carrying section 9 and a single propulsion system carrying section 10 as illustrated in FIG. 8, the modular airframe 2 now exemplarily comprises a single load carrying section 9 and four propulsion system carrying sections 10. In other words, an underlying number of load carrying sections and propulsion system carrying sections can advantageously be determined based on application and aircraft-specific design requirements.

Figure 10:
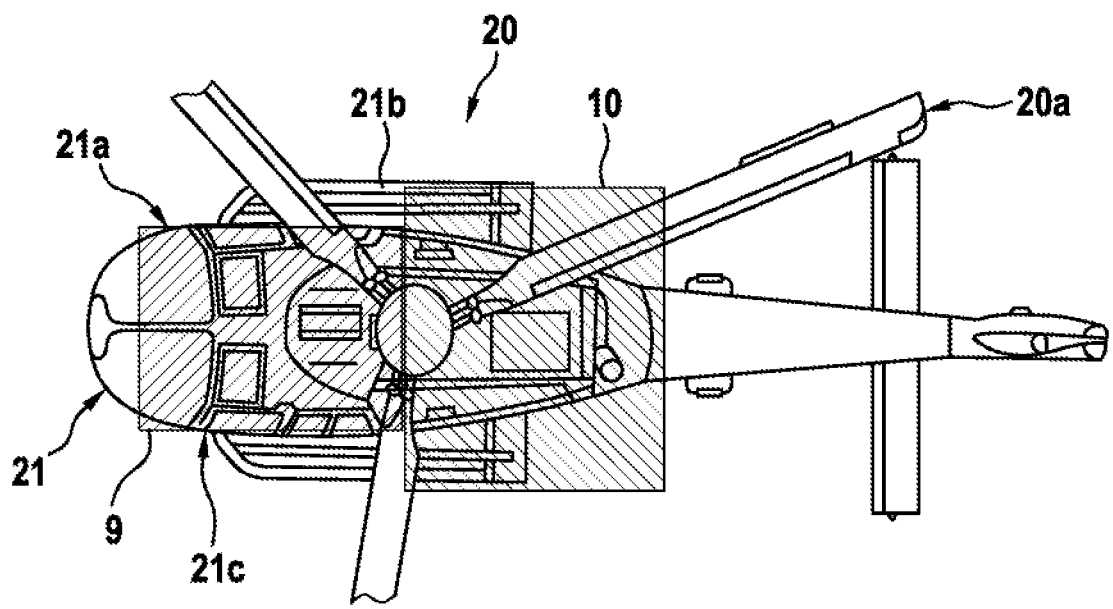
FIG. 10 shows a top view of a helicopter with several zones according to an aspect of the present invention.

FIG. 10 shows a helicopter 20 with a main rotor 20a and an airframe 21. The airframe 21 preferably comprises a load carrying framework 21a and is rigidly attached to a landing gear 21b, which is illustratively of the skid-type. The airframe 21 preferentially defines at least a cabin 21c. According to one aspect, the airframe 21 is divided into the at least one load carrying section 9 and the at least one propulsion system carrying section 10 of FIG. 1 to FIG. 4.

It should be noted, that FIG. 10 intends to illustrate that the teachings of the present invention can readily be applied to any aerial vehicle, including conventional helicopters. It should further be noted, that the above-described zonal approach, which is illustratively applied to the helicopter 20, does not require a modular implementation of the airframe 21. Instead, the zonal approach and the modularity of the airframe 21 can be considered separately.

Figure 11:
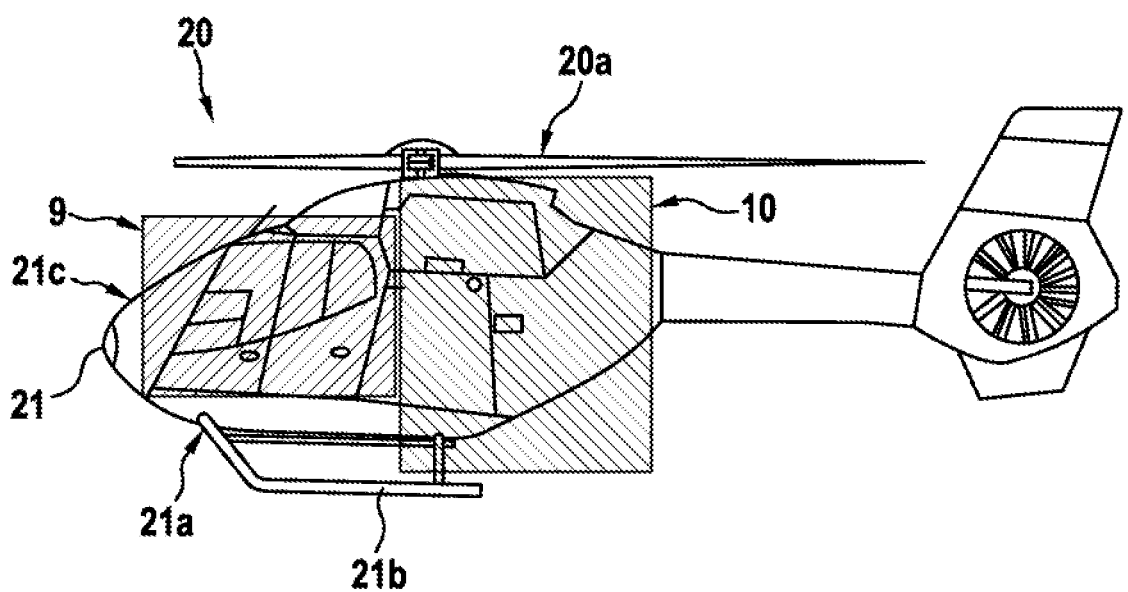
FIG. 11 shows a side view of the helicopter of FIG. 10.

FIG. 11 shows the helicopter 20 of FIG. 10 for further illustrating an exemplary arrangement of the at least one load carrying section 9 and the at least one propulsion system carrying section 10 of FIG. 10 on the helicopter 20.

It should be noted that modifications of the above described aspects of the present invention are also within the common knowledge of the person skilled in the art and, thus, also considered as being part of the present invention. For instance, it should be noted, that the above-described zonal approach with e.g. the zones 19a, 19b, 19c in FIG. 8, which is illustratively applied to the aircraft 1, does not require a modular implementation of the airframe 2 thereof. Instead, the zonal approach and the modularity of the airframe 2 can be considered separately. Furthermore, the above-described zonal approach with e.g. the zones 19a, 19b, 19c in FIG. 8, which is illustratively applied to the aircraft 1, and the modular implementation of the airframe 2 thereof, can be provided independent on an underlying propulsion system, which must, thus, not necessarily be implemented by means of an electrical environment, in particular a high-voltage electrical environment.

REFERENCE LIST

1 Multirotor aircraft
1a Aircraft longitudinal direction
1b Aircraft lateral direction
1c Aircraft vertical direction
2 Modular aircraft airframe
2a Load carrying framework
2b Landing gear
2c Aircraft cabin
3 Thrust producing units
3a, 3b, 3c, 3d Thrust producing unit
4 Thrust producing units structural supports
4a, 4b, 4c, 4d Thrust producing unit structural support
5 Engines accommodations
5a, 5b, 5c, 5d Engine accommodation
6 Electrical Engines
6a, 6b, 6c, 6d Electrical Engine
7 Rotor blades
7a, 7b, 7c, 7d Rotor blade
8 Covering items
8a, 8b Energy source cover structural shells
8c Upper deck structural shell
8d Upper core structural shell
8e Bottom structural shell
8f Lower core structural shell
8g Alternative energy source cover structural shell
9 Load carrying section
9a Load carrying section framework
10 Propulsion system carrying section
10a Propulsion system carrying section framework
11 Electrical energy source
11a, 11b, 11c Energy source units
12a, 12b, 12c, 12d, 12e Dismounting directions
13a Air inflow direction
13b Air outflow direction
14 Energy distribution system
15 Vertical frames
15a, 15b, 15c, 15d, 15e Vertical frame
16 Longerons
16a, 16b, 16c Longeron
17 Luggage and/or cargo
18 Energy source units quick releases
19a, 19b, 19c Propulsion system carrying zones
20 Helicopter
20a Helicopter main rotor
21 Helicopter airframe
21a Helicopter load carrying framework
21b Helicopter landing gear
21c Helicopter cabin

What is claimed is:

1. An aircraft comprising:
an airframe and at least one thrust producing unit, the at least one thrust producing unit being electrically powered by an associated electrical engine that is electrically connected to an electrical energy source via an electrical energy distribution system, wherein the airframe comprises at least one load carrying section and at least one propulsion system carrying section,
wherein the at least one load carrying section and the at least one propulsion system carrying section are segregated from each other, wherein the at least one load carrying section is provided for transportation of passengers and/or cargo, and wherein the at least one propulsion system carrying section carries the electrical energy source and the electrical energy distribution system,
the at least one propulsion system carrying section comprising at least a first zone and a second zone that are segregated from each other, the electrical energy distribution system being only carried by the first zone and the electrical energy source being only carried by the second zone; and the airframe comprising at least one segregating frame that segregates the at least one load carrying section from the at least one propulsion system carrying section, wherein the first zone is segregated from the second zone of the at least one propulsion system carrying section by the at least one segregating frame or by a longeron or by a structural shell.

2. The aircraft of claim 1,
wherein the airframe comprises at least one longeron that segregates the first zone from the second zone.

3. The aircraft of claim 1,
wherein the at least one propulsion system carrying section comprises at least one third zone that is segregated from the first zone and spaced apart from the second zone, the at least one third zone being provided for carrying at least a portion of the electrical energy source.

4. The aircraft of claim 3,
wherein the airframe comprises at least one longeron that segregates the first zone from the at least one third zone.

5. The aircraft of claim 3,
wherein the airframe comprises a load carrying framework and at least one covering item, wherein the third zone is at least partly arranged between the load carrying framework and the at least one covering item.

6. The aircraft of claim 5,
wherein the at least one covering item is shaped to allow inflow of a cooling air stream at least into the second zone for cooling at least the electrical energy source.

7. The aircraft of claim 1,
wherein the electrical energy source is a high-voltage energy source.

8. The aircraft of claim 1,
wherein the electrical energy source is exchangeable and comprises at least two exchangeable energy source units.

9. The aircraft of claim 8,
wherein quick releases are provided that allow at least a quick release of the at least two exchangeable energy source units for removal of the at least two exchangeable energy source units from the aircraft.

10. The aircraft of claim 1,
wherein the at least one load carrying section and the at least one propulsion system carrying section are segregated from each other in longitudinal direction of the aircraft.

11. The aircraft of claim 1,
wherein at least three additional thrust producing units are provided, each additional thrust producing unit being electrically powered by an associated electrical engine that is electrically connected to the electrical energy source via the electrical energy distribution system, the aircraft being implemented as a multicopter.

12. The aircraft of claim 1,
wherein the aircraft is configured as a vertically taking off and landing air vehicle.

13. An aircraft comprising:
an airframe and at least one thrust producing unit, the at least one thrust producing unit being electrically powered by an associated electrical engine that is electrically connected to an electrical energy source via an electrical energy distribution system, wherein the airframe comprises at least one load carrying section and at least one propulsion system carrying section, wherein the at least one load carrying section and the at least one propulsion system carrying section are segregated from each other, wherein the at least one load carrying section is provided for transportation of passengers and/or cargo, and wherein the at least one propulsion system carrying section carries the electrical energy source and the electrical energy distribution system, the at least one propulsion system carrying section comprising at least a first zone, a second zone, and a third zone that are segregated from each other, the electrical energy distribution system being only carried by the first zone and the electrical energy source being only carried by the second zone, wherein the first zone is positioned in between the second zone and the third zone; and the airframe comprising at least one frame that segregates the at least one load carrying section from the at least one propulsion system carrying section, wherein the first zone is segregated from the second zone of the at least one propulsion system carrying section by the at least one frame or by a longeron or by a structural shell.

14. The aircraft of claim 13 further comprising a first longeron segregating the first zone from the second zone and a second longeron segregating the first zone from the third zone.

15. The aircraft of claim 13, wherein the aircraft is configured as a vertically taking off and landing air vehicle.

16. The aircraft of claim 13, wherein the electrical energy source is a high-voltage energy source.

17. An aircraft comprising:
an airframe and at least one thrust producing unit, the at least one thrust producing unit being electrically powered by an associated electrical engine that is electrically connected to an electrical energy source via an electrical energy distribution system, wherein the airframe comprises at least one load carrying section and at least one propulsion system carrying section, wherein the at least one load carrying section and the at least one propulsion system carrying section are segregated from each other, wherein the at least one load carrying section is provided for transportation of passengers and/or cargo, and wherein the at least one propulsion system carrying section carries the electrical energy source and the electrical energy distribution system, the at least one propulsion system carrying section comprising at least a first zone and a second zone that are segregated from each other by a first longeron, the electrical energy distribution system being only carried by the first zone and the electrical energy source being only carried by the second zone; and the airframe comprising at least one frame that segregates the at least one load carrying section from the at least one propulsion system carrying section.

18. The aircraft of claim 17,
wherein the at least one propulsion system carrying section comprises at least one third zone that is segregated from the first zone and spaced apart from the second zone, the at least one third zone being provided for carrying at least a portion of the electrical energy source.

19. The aircraft of claim 18, wherein the airframe comprises second longeron that segregates the first zone from the at least one third zone.

20. The aircraft of claim 17, wherein the electrical energy source is a high-voltage energy source.

* * * * *